Figure 1:
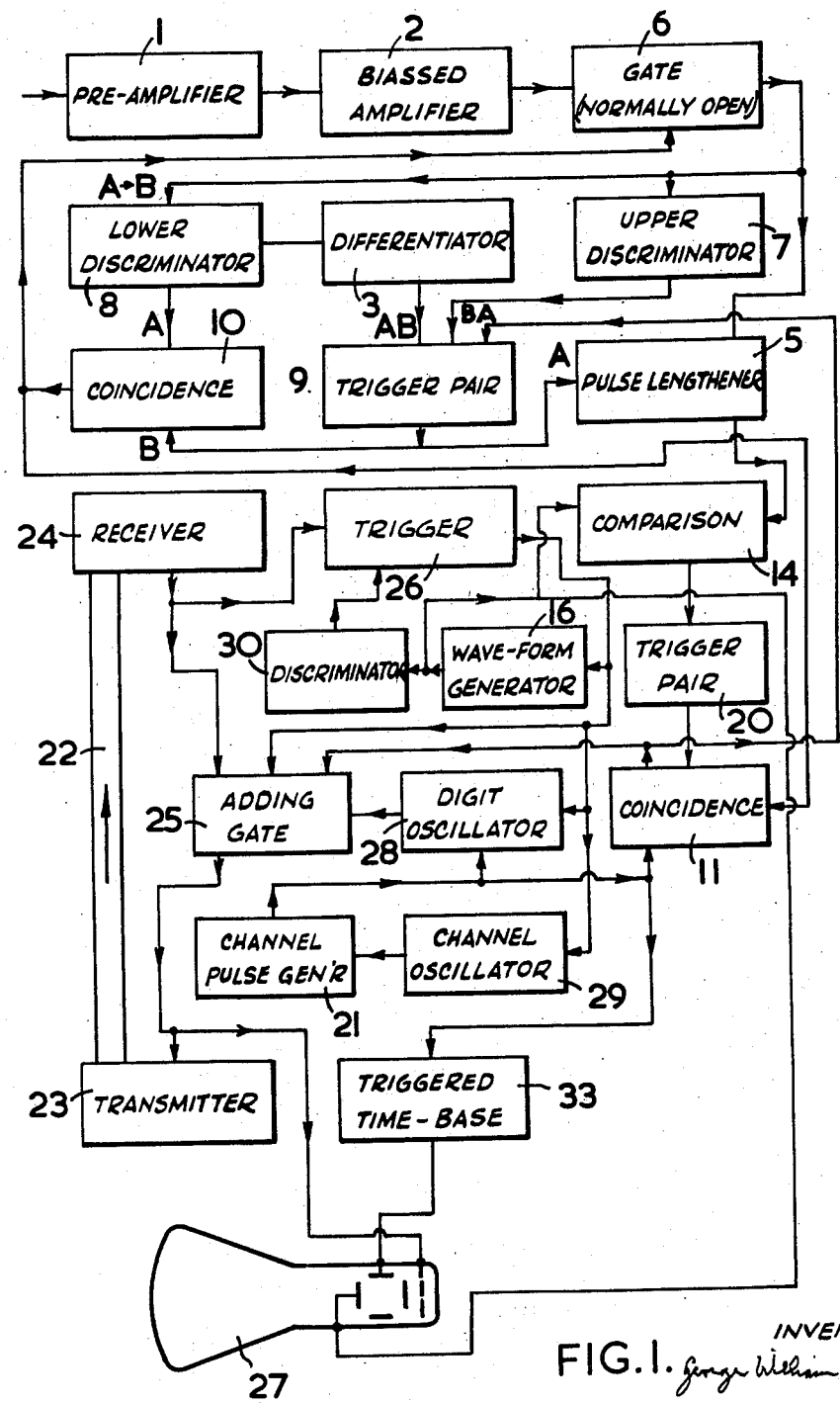

Dec. 30, 1958 G. W. HUTCHINSON 2,866,599
METHOD OF AND APPARATUS FOR SORTING ELECTRICAL
PULSES ACCORDING TO THEIR AMPLITUDE
Filed May 27, 1952 3 Sheets-Sheet 2
FIG.2.
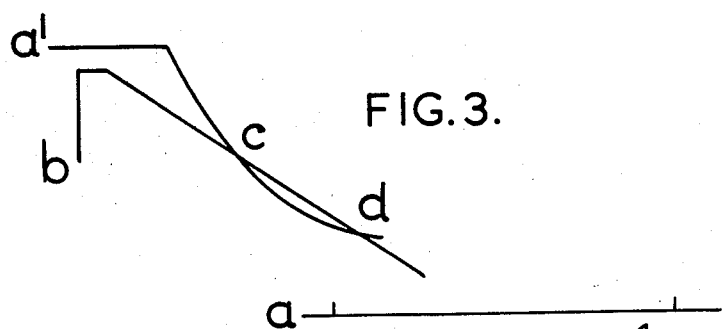
FIG.3.
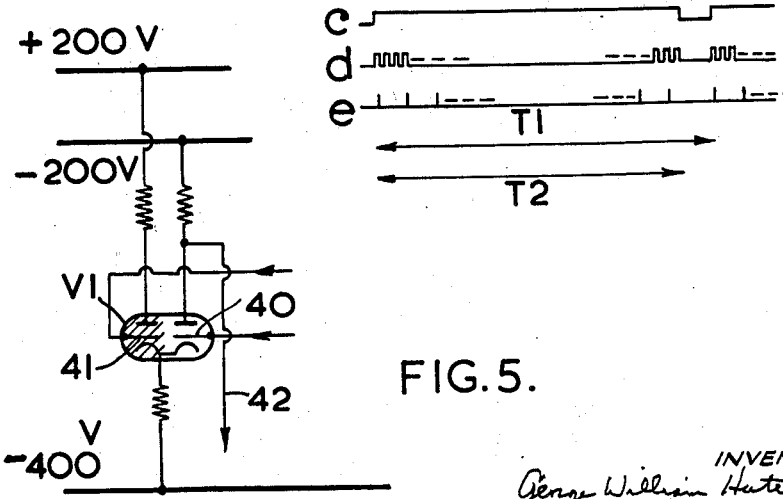
FIG.4.
FIG.5.
INVENTOR
George William Hutchinson
BY
ATTORNEYS Dec. 30, 1958  G. W. HUTCHINSON  2,866,599
METHOD OF AND APPARATUS FOR SORTING ELECTRICAL
PULSES ACCORDING TO THEIR AMPLITUDE
Filed May 27, 1952   3 Sheets-Sheet 3

INVENTOR
George William Hutchinson
BY Stevens, Davis, Miller & Mosher
his ATTORNEYS United States Patent Office
2,866,599
Patented Dec. 30, 1958

2,866,599

METHOD OF AND APPARATUS FOR SORTING ELECTRICAL PULSES ACCORDING TO THEIR AMPLITUDE

George William Hutchinson, Cambridge, England, assignor to National Research Development Corporation, London, England, a British corporation Application May 27, 1952, Serial No. 290,207

Claims priority, application Great Britain June 26, 1951

6 Claims. (Cl. 235—92)

This invention relates to a method of an apparatus for analysing a succession of electrical pulses according to a characteristic value, for example the potential amplitude or the integral value, of the several pulses, whereby pulses with values within each of a number of ranges are sorted into separate channels, so that the number of pulses in each channel can be indicated or recorded. The accuracy of such pulse analysers is largely dependent on the relative drift which is liable to occur in the boundaries between the channels. In many known types of analysers each of these boundaries is determined by a separate mechanism, for example, by a series of thermionic valves.

An analyser has also been proposed in which an oscillator is gated for a time starting with the arrival of the pulse and of duration depending on the amplitude of that pulse. The appropriate channel is determined by counting the oscillations occurring during this time, and the number of pulses in each channel is recorded by separate static devices, for example mechanical counters. In this method the relative widths of the channels depend on a time measurement, which can be made very accurate, but the speed of operation is low unless the recording devices have a degree of complication which is in many cases prohibitive.

The present invention provides an analyser in which the relative widths of the channels are likewise determined by a time measurement, but which is greatly simplified in construction for a given speed of operation. According to the invention a succession of electrical pulses is analysed according to a characteristic value by recording, in a memory cycle having a constant time period, each pulse at a time in the cycle which is correlated with the value of that pulse by comparing this value with the instantaneous value of a recurring waveform sychronised with the memory cycle, reading the contents of the memory cycle, and indicating or recording separately the parts of the signal so obtained occurring at time intervals corresponding with the value channels into which it is desired to sort the pulses. The part of the said waveform used for comparison may advantageously vary linearly with time.

Each pulse may be recorded individually in the memory cycle, that is, with a one to one correspondence between the pulses recorded and the pulses in the memory cycle, but since the time occupied by each such record is finite, this mode of operation would limit the capacity of the system to an extent which would be intolerable for many applications. It is, therefore, preferred to divide the memory cycle into a plurality of discrete sections, so that the time interval corresponding with each channel contains a number of such sections. Each section is capable of accommodating an equal number of pulses and when any section has received its complement of pulses a change is made in the digits of the next higher section. Thus each pulse position may be regarded as a digit position in a counting system and the recording of a pulse takes the form of an arithmetical addition to the existing contents of the channel in which the pulse occurs. Preferably the number of digit positions in each section is one, in which case the counting system is binary.

The signal obtained from the memory cycle may advantageously be displayed on a cathode ray tube whose beam displacement in one co-ordinate is synchronised with the aforesaid waveform, and whose beam displacement in the other co-ordinate is provided by a time base synchronised with the channel intervals.

For producing the memory cycle it is preferred to use a supersonic delay line such as a mercury or magnetostrictive delay line. Alternatively there may be used, for example, a cathode ray tube store or a magnetic or electrostatic disc, drum or tape. It will be understood that where the recording of a pulse takes the form of an addition in a numbering system, the memory device must be such that not only can new records be made in the cycle but also existing records can be erased.

A preferred form of the invention is illustrated by way of example by the accompanying drawings, in which
Figure 1 is a block diagram of the pulse analyser,
Figures 2, 3 and 4 are diagrams of certain of the waveforms utilised in the analyser, and
Figure 5–8 are diagrams illustrating in greater details certain circuits used in the analyser.

Referring to Figure 1 of the drawings, the pulses to be analysed are fed to a pre-amplifier 1 which raises the voltage of the pulses to a level at which they can best be handled by the succeeding parts of the circuit. It is not generally necessary to analyse the complete spectrum of incoming pulses. There is usually a lower and upper limit to the amplitudes which need be analysed. In order to enable pulses of the required amplitude to be accepted and the others rejected the pulses amplified in the pre-amplifier 1 are fed to a suitable biassed amplifier 2 whose output is fed via a gate 6 to a pulse lengthener 5 and a selector circuit which conditions the pulse lengthener to accept only pulses within the desired amplitude range.

The function of the gate 6 is to prevent the passage of a pulse until the previous pulse has been sorted. Pulses passing through the gate are fed to an upper discriminator 7 and a lower discriminator 8. The lower discriminator is a two-state circuit of conventional design, of the kind which has one stable and one unstable state, a quiescent state A and a state B into which it is changed by the arrival of any pulse from gate 6 which exceeds the minimum amplitude to be analysed. This change of state is converted by a differentiating circuit 3 into a pulse which is fed to a trigger pair 9 which is also a two-state circuit of conventional design, having two stable states A and B. The pulse from differentiating circuit 3 changes its state from A to B.

The pulse lengthener 5 comprises a storage condenser which can be charged through a diode by pulses arriving from gate 6, and which retains this charge until the operation of sorting has been completed, whereupon the condenser is discharged. A pulse lengthener of any conventional design may be used. An example of such a circuit is shown in "Handbook of Industrial Electronic Circuits"—Markus and Zeluff (McGraw-Hill) page 127—, Pulse-stretching Circuit for Use with Vacuum-tube Voltmeter. For discharging the condenser it is preferred to use a diode heated by means of a well-insulated transformer.

When the pulse entering the discriminator 8 dies away below the lower limit which actuates the discriminator, the latter reverts to state A. The output of the discriminator 8 and trigger pair 9 are both connected to a coincidence circuit 10 which is arranged to give a prolonged signal when the trigger pair 9 is in state B and the discriminator 8 is simultaneously in state A. The signal from circuit 10 is fed to the gate 6 to close this gate and also to a second coincidence circuit 11 described below.

Any pulse of amplitude greater than the required maximum causes a signal to be produced by the upper discriminator 7. The discriminator 7 is a two-state circuit of conventional design, having one unstable and one stable state, in which it is biassed so as only to be triggered into its unstable state by a pulse of sufficient amplitude. When so triggered it produces a signal which is fed to trigger pair 9 and causes it to revert from state B (into which it will have been set by discriminator 8) to state A. Since this occurs before the lower discriminator has reverted to state A, the coincidence circuit 10 is not actuated and gate 6 remains open. The trigger pair 9 is also connected to the pulse lengthener 5, and reversion of the trigger pair from state B to state A causes the pulse lengthener condenser to discharge.

Voltages stored in the pulse lengthener 5 are fed to a comparison circuit 14 which is also supplied with a sawtooth wave from a linear waveform generator 16. The waveforms from the pulse lengthener and the waveform generator are shown in Figure 2 as $a$ and $b$ respectively. The output of the circuit 14 is fed to a trigger pair 20, the arrangement being such that when the potentials of waveforms $a$ and $b$ are equal, with waveform $b$ becoming more negative, the trigger pair changes its state, transmitting an extended negative signal to the coincidence circuit 11, which is negative going. The circuit 11 is arranged to produce a pulse on coincidence of the signal from the trigger pair 20 and a pulse from a pulse generator 21 to be described below, provided that the signal from coincidence circuit 10 described above has arrived before that from trigger pair 20. The reason for introducing the signal from circuit 10 will be understood from Figure 3. If the pulse to be recorded rises only gradually to its maximum amplitude, the wave from the pulse lengthener having the form $a'$ in Figure 3, the time sweep $b$ will intersect it at two points $c$ and $d$, neither of which must be recorded. Owing to the fact that the circuit 10 will not have given its signal at either intersection, the circuit 11 is not actuated. It will be understood from the following description that such a pulse will be counted on the next cycle.

The pulse from circuit 11 is fed to trigger pair 9, causing it to revert from state B to state A, and to the recording and memory circuit which will now be described. Reversion of the trigger pair 9 resets the pulse lengthener 5, thus ending the signal from trigger pair 20, and causes circuit 10 to revert to state A, whereby gate 6 is re-opened.

The memory cycle comprises a delay line 22, which may be a mercury delay line, having a transmitter 23 and a receiver 24. Mercury delay line memory or storage devices are well known and are used, for example, in electronic digital computing machines. Some forms are described, for example, in an article in the publication "Electronics," the issue for November 1947, commencing on page 134. Interposed between the receiver and transmitter is an adding gate 25, to which is fed the output of coincidence circuit 11. The cycle is synchronised with the comparison and sorting system described above by means of a trigger circuit 26, a square wave digit oscillator 28 and a channel pulse generator 21. The channel pulse generator is actuated by a channel oscillator 29. The oscillators 28 and 29 are controlled by the trigger circuit 26 in such a manner that if the circuit is in one state (A) the oscillators are free to oscillate while if the circuit is in the other state (B) they are prevented from oscillating, the phase of the oscillators being defined with respect to the instant of transition of trigger circuit 26 from B to A. The trigger circuit is A. C. coupled with such time constants that when in state B it will, if left free, revert to state A after a time which will be denoted by T3. The output of the trigger circuit is fed to the adding gate 25 as well as to the oscillators 28 and 29, and transit from state B to state A is arranged to inject a pulse into this gate.

The output of the channel pulse generator 21 is used to synchronise the digit oscillator 28. The output of the waveform generator 16 is fed to an amplitude discriminator 30 which produces a pulse when the time base reaches a predetermined potential. This pulse is fed to trigger circuit 26 and changes its state from A to B. A certain time after the instrument is switched on, there being no pulses in the delay line, this transit from A to B is brought about and after a further time T3 the pair reverts to state A. This causes the oscillators 28 and 29 to start and also injects a pulse into adding gate 25. The output of the latter is fed to the transmitter 23, which injects a pulse into the delay line 22. After a time which will be denoted as T1 this pulse reappears at the output of the receiver 24. Meanwhile after a time T2 the trigger circuit 26 has been forced to change its state from A to B by the output of the discriminator 30. The speed of the waveform generator 16 and the level of the discriminator 30 are so chosen that T2 is a little less than T1, T3 being greater than T1—T2. The pulses due to the transit of trigger circuit 26 from B to A and the waveform from the generator 16 are indicated at $a$ and $b$ respectively of Figure 4, in which $c$ represents the two states A and B of the trigger pair.

Arrival of the pulse from receiver 24 causes the trigger pair to revert to state A and injects a pulse into the delay line 22. The cycle is then repeated, being locked to the time T1, provided T3 is greater than T1—T2.

The waveforms from the digit oscillator 28 and the channel pulse generator 21 are shown at $d$ and $e$ respectively of Figure 4. The channel pulses define channel time intervals and each channel time interval is divided by the digit pulses into a number, denoted here by $n$, of digit intervals. A pulse from coincidence circuit 11 will arrive at the adding gate 25 on occurrence of the channel pulse which terminates the channel time interval during which the amplitude of the waveform $b$ reached that of the incoming pulse. The output of digit oscillator 28 is fed to the adding gate 25 which is such that when a pulse arrives from the coincidence circuit 11 it is added arithmetically to the pulses injected into the adding gate from the receiver 24, that is to say, it is added in such a manner that each digit interval in the channel time interval commencing with the pulse from circuit 11 represents a digit in a binary numbering scale, the first such digit interval representing the digit place $2^0$ and the last $2^{n-1}$.

It will be noted that signals due to the coincidence circuit 11 can only occur during the time interval T2 and that, since the trigger circuit 26 is already in state A during this time, such signals have no effect on the synchrony of the cycle.

Instead of feeding the output of coincidence circuit 11 to trigger pair 9 and adding gate 25 in parallel, the trigger pair 9 may be modified so that pulses can be passed from circuit 11 to adding gate 25 by way of trigger pair 9. This will ensure that where coincidence pulses from circuit 11 are of less than the full amplitude, due, for example, to the occurrence of a signal from trigger pair 20 during the time occupied by a channel pulse, the adding gate will be actuated only if the amplitude of the coincidence pulse is sufficient to operate the trigger pair 9.

The output of the adding gate 25, in addition to being recycled through the delay line 22, is displayed on the screen of a cathode ray tube 27. The X-plates of this tube are connected to the linear time sweep 16 and the Y-plates to a triggered time base 33 actuated by pulses from the channel pulse generator 21. There is thus obtained a raster of faint vertical lines each of which corresponds with one channel time interval. Pulses from the adding gate are used to brighten the trace, so that each vertical line contains a series of bright dots and faint spaces representative of the numbers 1 and 0 respectively in the appropriate digit positions, with $2^0$ occurring at the bottom of each line. In addition, means (not shown) may be provided whereby each digit pulse produces a slight brightening of the trace in order to facilitate reading of the digit levels.

It will be understood that the speed at which the apparatus can operate is dependent on the time T1. Where the time of arrival of the pulses is random, as for example in the case of pulses due to nuclear emanations, the maximum rate at which the pulses can be counted is 2/T1 per second if T1 is expressed in seconds. If the pulse rate is comparable with 2/T1, the apparatus takes a random sample not weighted according to pulse value. In cases where there is a correlation between pulse value and time of arrival, the spectrum will not be distorted if the interval between successive related pulses is greater than T1.

The size of each channel and the number of digit positions therein can readily be varied by changing the frequency of the channel oscillator 29. It will be understood that each time a channel is filled, it will automatically be cleared, one pulse incidentally being added to the next higher channel. If desired, means may be provided for recording the number of times each channel is cleared, thereby extending the capacity of the apparatus.

Figure 5 shows the basic diagram of a circuit suitable for use as the coincidence circuit 10. The output of trigger pair 9 is fed to grid 40 of a double triode V1, while that of lower discriminator 8 is fed to grid 41. The left hand side of the valve V1 is normally conducting and the right hand side cut off. When the trigger pair 9 and lower discriminator change to state B at the beginning of an incoming pulse, both grids 40 and 41 are made more positive by the same amount, and current continues to flow in the left hand anode but not the right. When, on delay of the incoming pulse, the lower discriminator 8 reverts to state A, the potential of grid 41 returns to normal and the current is transferred to the right hand anode, thus giving a "count now" signal on the output wire 42.

Figure 6:
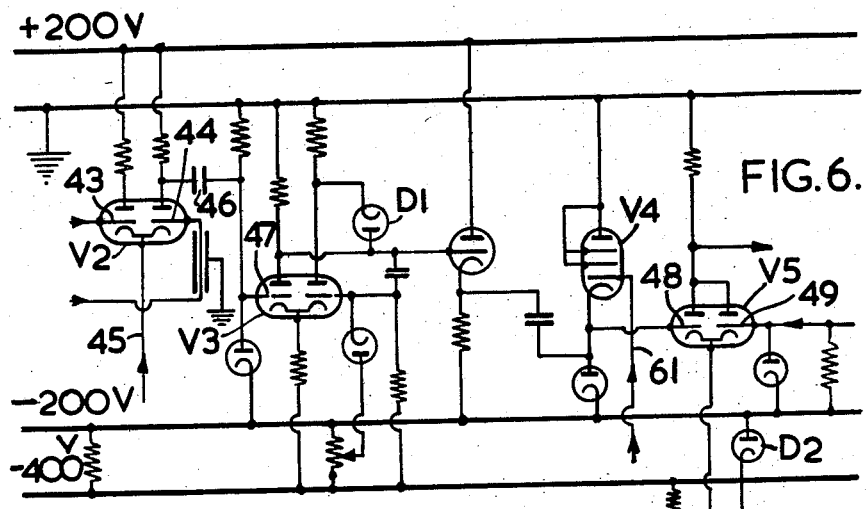

Figure 6 is a diagram of a circuit performing the functions of the comparison circuit 14, trigger pair 20 and coincidence circuit 11. Waveforms $a$ and $b$ (Figure 2) are fed to grids 43 and 44 respectively, of two valves shown here as a double triode V2 whose cathodes are fed with a constant current on wire 45. The right hand anode of V2 is connected via a condenser 46 with grid 47 of a double triode V3, which is connected to function as a cathode coupled trigger pair. A diode D1 is connected between the anodes of triode V3 and serves to define the critical potential applied to grid 47 as that at which the currents in both anode circuits of valve V2 are equal, with that in the left hand anode circuit increasing. When this critical potential occurs a negative signal appears on the left-hand anode of V3, and this is transferred to grid 48 of double triode V5 provided the control grid of valve V4 has first been made negative. The latter is connected by wire 61 with the output wire 42 of the coincidence circuit 10. Grid 49 of valve V5 is connected with the output of the channel pulse generator 21, which delivered negative pulses defining the channel intervals. On arrival of the channel pulse next following the appearance of a negative potential on grid 48, the whole cathode current of valve V5 is directed into a diode D2 and is therefore removed from the common anode of V5, from which the output of the circuit is taken.

Figures 7, 8:
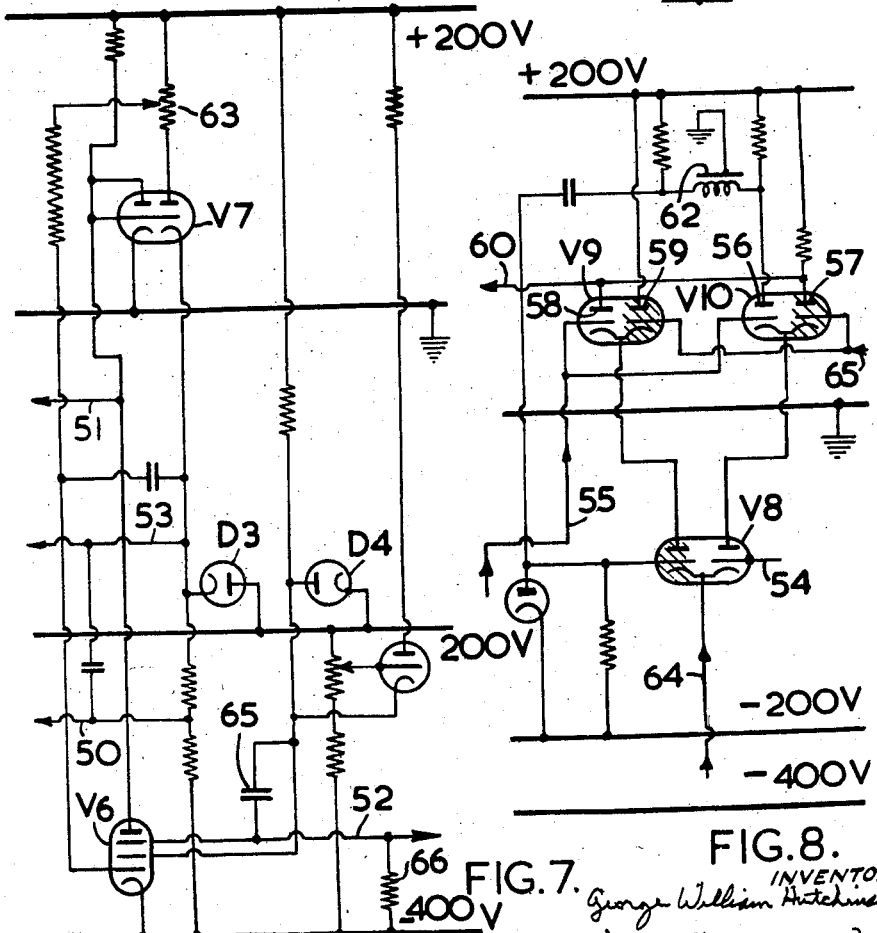

Figure 7 is a diagram of a circuit performing the functions of the waveform generator 16, discriminator 30 and trigger circuit 26. A pentode V6, is connected to function as a transition Miller time base. The anode of V6 is connected to the left hand anode and both grids of a double triode V7, the left hand side of which serves as the upper waiting stop for V6 while the right hand side functions as a cathode follower whose cathode is connected to the cathode of a diode D3. The latter acts as the lower stop for the waveform generator and thus corresponds with discriminator 30 in Figure 1. A diode D4 is connected as a current bias on the screen grid of valve V6. A resistance 63 in the right hand anode circuit of valve V7 applies positive feedback to the control grid of valve V6 for the purpose of increasing the linearity of the waveform generated thereby. The output of the cathode follower V7 is connected by way of wire 50 to the X-plates of the cathode ray tube 32 and by way of wire 53 to the comparison circuit 14 (Figure 1). The screen and suppressor grid of valve V6 function as the trigger circuit 26 of Figure 1, wire 51 being connected to the receiver 24 and wire 52 to actuate the digit oscillator 28 and the channel oscillator 29. The time constant which causes the trigger circuit to revert from state B to state A is in the A. C. coupling between the screen and suppressor grid of valve V6 constituted by condenser 65 and resistance 66.

Figure 8 is a diagram of a circuit suitable for use as the adding gate 25. The circuit comprises three double triodes V8, V9 and V10. The potentials applied to the electrodes of these valves are such that in the normal or quiescent state those sides of the valves which are shown shaded are conducting, while those which are not shaded are cut off. The positive going output of coincidence circuit 11 is fed to the right hand grid of valve V8 through wire 54, and the positive going output of the receiver 24 wire 55. The negative going output of the digit oscillator 28 is fed as a square waveform of current to the cathodes of valve V8 on wire 64. Negative going carry-in pulses are fed to the left hand grid of valve V8, as described below. Owing to the fact that pulses from circuit 11 arrive only on the occurrence of a channel pulse, which corresponds with the digit of least significance of the channel concerned, there can be no carry-in digit arriving simultaneously with a pulse from circuit 11. A negative pulse is generated on anode 56 of valve V10 at the appropriate digit position when a pulse from circuit 11 coincides with a pulse from receiver 24.

Thus, a pulse on anode 56 corresponds with a carry-out digit, which must be delayed through one digit position and fed to valve V8 as a carry-in digit at the next digit position. The pulse is therefore passed from anode 56 through a delay network 62, which delays it by one digit interval, to the left hand grid of valve V8. The operation of this circuit is therefore as follows: digit pulses from digit oscillator 28 "prime" the circuit at each digit interval by lowering the potential on the cathode of V8. Four possibilities now arise: DI$f$, coincidently with a pulse a signal is received from coincidence circuit 11, the right hand part of V8 conducts and "primes" V10. Assuming there is no signal on wire 55 from the memory cycle, the right hand part of V10 will conduct giving a negative signal on its anode which is applied over wire 60 to the delay line transmitter 23. A signal is thus "written-in" in the position of least significance of the digit pulse train of the channel to which the pulse being counted has been allotted (the pulse from 11 must coincide with the appropriate channel pulse as above described).

On arrival of a pulse from 11 as set out above a signal is also received from the memory cycle over wire 55. This causes the left hand part of V10 to conduct, so that a signal is applied to delay line 62. One digit period later the situation will then arise that:

There is no signal from 11 but there is a signal from delay line 62 on the left hand grid of V8 which causes the right hand part of V8 to conduct. This may give rise to either of two possibilities, ($a$) in the absence of a signal over wire 55 the right hand part of V10 will conduct applying a signal to the memory cycle as above described or; ($b$) a signal will simultaneously be received over wire 55 and the left hand part of V10 will conduct applying a signal once more to the delay line 62.

In the absence of a signal from coincidence circuit 11 or from delay line 62 the left hand part of V8 will conduct so that V9 will be "primed." This being so, in the absence of a signal over wire 55 the right hand part of V9 will conduct and no signal will be passed on. Alternatively, if a signal from the memory cycle is received over wire 55 the left hand part of V9 will conduct providing an output over wire 60 to "re-write" a signal into the memory cycle to replace that received over wire 55.

The right hand grids of valves V9 and V10 are connected through wire 65 to the output of trigger circuit 26, so that the initial transition of the latter from state B to state A on starting the machine injects a negative pulse into these grids thus producing a negative pulse on the output wire 60, to mark the start of the memory cycle.

The operation of the machine will now be apparent. On switching on, the waveform generator 16 will start up and at a predetermined potential in the sweep a pulse is generated by amplitude discriminator 30 which is fed to trigger circuit 26 changing its state from A to B. After time $T_3$ the trigger circuit reverts from state B to state A causing oscillators 28 and 29 to start and injecting a pulse into adding gate 25. The output from 25 injects a pulse into delay line 22 as above described, this pulse being circulated through the delay line 22, receiver 24, adding gate 25 and transmitter 23, once during each cycle of the waveform generated by 16.

On the screen of cathode ray tube 27 will appear a raster of faint vertical lines.

Assume now that a pulse arrives at the input to amplifier 1, which after amplification in 1 and 2 is within the range of amplitudes to be counted. This amplified pulse passes gate 6 and is applied to pulse lengthener 5 and to the discriminators 7 and 8. Because the pulse is below the maximum acceptable amplitude and above the minimum, discriminator circuit 7 is not operated but discriminator circuit 8 is. Circuit 8 is triggered from state A to state B producing an output which triggers the trigger pair 9. When the pulse dies below the lower limit which actuates the discriminator, the circuit 8 reverts to state A producing another output pulse which is applied to coincidence circuit 10. The circuit 10 detects the coincidence—pulse from circuit 8, trigger pair 9 in state B—and responds to close the gate 6 so that no further pulses will be accepted through gate 6 for the time being.

Meanwhile the voltage set up in pulse lengthener 5, corresponding to the amplitude of the pulse being counted, is being compared in circuit 14 with the rising voltage sweep from waveform generator 16 and, at a time in the sweep determined by the voltage set up in the pulse lengthener, trigger pair 20 will be actuated and coincidence circuit 11 will detect the coincidence—actuation of circuit 20, actuation of coincidence circuit 10, and a pulse from channel pulse generator 21—and will apply a pulse to adding gate 25. Now the pulse applied by circuit 11 to adding gate 25 will obviously coincide with the channel pulse corresponding to the channel for which the pulse is to be allotted for counting. As there have been no previous pulses in that channel, the adding gate will be caused to apply a pulse to the transmitter 23 to inject a pulse into the delay line 22. This pulse will now circulate in the memory cycle, being timed in relation to the pulse already circulating, and which was introduced by trigger 26, in accordance with the channel to which the counted pulse has been allotted by the comparison in circuit 14. A bright spot will, at the same time, appear on the cathode ray tube 27 at the bottom of the vertical line corresponding to the channel to which the counted pulse has been allotted.

The output from coincidence circuit 11 is also applied to trigger pair 9, restoring this circuit to state A, causing pulse lengthener 5 to be cleared and circuit 10 to revert to state A reopening gate 6.

If now a further pulse is received and allotted to the same channel as the one which has just been counted, a signal will be applied to adding gate 25 simultaneously with the arrival of the circulating pulse in the memory cycle, set in by the previously counted pulse. This will cause the adding gate 25 not to apply a pulse to the transmitter 23 at this instant, but to apply one to the delay line 62 in the adding gate so that an output to the memory cycle will be supplied by the adding gate one digit period later, and be circulated thereafter in the correspondingly later position in the cycle. Thus on the cathode ray tube 27 the bright spot previously written in at the lowermost position of the appropriate channel will disappear and a spot will appear instead one digit position up, corresponding to a count of two in that channel. A further pulse in that channel would reintroduce a pulse in the first digit position of that cycle, reinserting a spot on the cathode ray tube display in the first position, and so the count would progress, according to the normal binary system, as further pulses were allotted to that channel.

If now a pulse is received the amplitude of which is below the lower limit to be counted, discriminator 8 is not operated, trigger 9 is not operated, coincidence circuit 10 detects no coincidence so that the gate 6 remains open, and circuit 11 detects no coincidence.

If, on the other hand, a pulse above the upper limit is received, both discriminators 7 and 8 are actuated and this has the effect that trigger pair 9 is set into state B by the output from discriminator 8 and back again to state A by discriminator 7, before discriminator 8 can supply its second output to actuate coincidence circuit 10. Pulse lengthener 5 is thus cleared and the gate 6 kept open.

It will now be seen how, after a given running time, the display on tube 27 will show a number of vertical columns of bright spots, the positions of which indicate by normal binary notation the numbers of pulses which have been received and allotted to the respective channels. The display may therefore be read visually to provide the answer, or may be photographed to produce a permanent record.

I claim:

1. Apparatus for analysing a succession of electrical pulses into a plurality of categories in accordance with a characteristic value of the several pulses comprising means for generating a recurrent sweep voltage, a circulatory storage system operating synchronously with said sweep voltage generating means, means for comparing the amplitude of each pulse to be categorised with the instantaneous value of said sweep voltage so as to obtain a signal at a time in said sweep cycle, in the cyclic period of said storage system, related to said amplitude, means for detecting the contents of said storage system, means for adding to the detected contents of said storage system in the position appropriate to its significance the signal obtained by said comparison and means for returning the detected contents modified by this addition to the storage system.

2. Apparatus for analysing a succession of electrical pulses into a plurality of amplitude categories comprising means for generating a recurrent sweep voltage, means for generating a succession of channel pulses timed in relation to said sweep voltage to define a plurality of voltage regions within the range of said sweep voltage and corresponding to said amplitude-categories, means for comparing the amplitudes of pulses to be categorised with the instantaneous value of said sweep voltage, means for detecting the channel pulse next after the sweep voltage has passed the amplitude of a pulse subjected to such a comparison, a circulatory storage system, and means for injecting into the circulating loop of said storage system a signal timed by the detected channel pulse, said circulatory storage system being cycled synchronously with said recurrent sweep voltage, whereby the signal injected is timed in relation to the circulatory cycle in accordance with the amplitude of the pulse categorised by said detected channel pulse.

3. Apparatus for analysing a succession of electrical pulses into a plurality of amplitude-categories comprising means for setting up a stored voltage representing the amplitude of a pulse to be categorised, means for generating a recurrent sweep voltage, means for generating a succession of channel pulses timed in relation to said recurrent sweep so as to define between successive channel pulses regions of voltage levels corresponding to the various amplitude-categories, means for generating a succession of digit pulses timed in relation to said channel pulses to provide a plurality of such digit pulses between successive channel pulses, comparison means for comparing the sweep voltage with the stored voltage and providing an output when said sweep voltage passes the level of said stored voltage, a coincidence circuit responsive to the coincidence of a channel pulse with an output from said comparison means, a circulatory storage system having an input, a delay channel, an output and a return path between said output and said input, said return path including an adding gate circuit and connections from said coincidence circuit to said gate circuit and from said digit pulse generating means to said gate circuit whereby signal pulses from said coincidence circuit and signals circulating in said storage system are added together in said adding gate circuit according to a digit code under time control of said digit pulses, the circulatory cycle of said storage system being synchronous with the recurrence period of said sweep voltage whereby signals from said coincidence circuit are coordinated with signals circulating in said storage system, amplitude-category by amplitude-category.

4. Apparatus according to claim 1 including means for displaying the contents of said storage system, said means comprising a cathode ray tube, connections feeding said recurrent sweep voltage as a deflection voltage in one coordinate to said cathode ray tube, time base generating means connected to said cathode ray tube, means for triggering said time base means at times within the excursion of said sweep voltage related to the various amplitude categories to produce deflections in the other coordinate and means for controlling the intensity of the cathode ray tube beam in accordance with signals from said storage system, whereby indications are produced on said cathode ray tube screen in distinct regions, each related to an amplitude category, of the numbers of pulses counted in each category.

5. In an apparatus according to claim 3 an adding gate circuit comprising a first two-state trigger circuit adapted when triggered by an output signal from said storage system to supply an input signal to said storage system, a delay line, a second two-state trigger circuit adapted when in one state to supply an input signal to said storage system and when in its other state to supply a signal to said delay line, a third two-state trigger circuit connected to, and adapted when in one state to render operative, said first two-state trigger circuit and connected to, and adapted, when in its other state to render operative, said second two-state trigger circuit, a connection from the coincidence circuit of said apparatus to said third trigger circuit whereby said circuit is triggered into its said other state by a signal from said coincidence circuit and a connection from said delay line to said third trigger circuit whereby, in the absence of a signal from said coincidence circuit, said third trigger circuit may be triggered into its said other state by a signal from said delay line.

6. In an adding gate as claimed in claim 5, a connection between said third trigger circuit and the digit pulse generating means of the apparatus, whereby said gate circuit is rendered operative to deliver its output signals by digit pulses from said digit pulse generating means.

References Cited in the file of this patent
UNITED STATES PATENTS 2,529,666   Sands _____ Nov. 14, 1950

OTHER REFERENCES

"Pulse Amplitude Analyzer for Nuclear Research Using Retreated Pulses," Westcott and Hanna, Review of Scientific Instruments, volume 20, No. 3, March 1949, pages 181 to 188.

"A Pulse-Amplitude Analyser of Improved Design," Cooke-Yarborough et al., Proceedings of the Institute of Electrical Engineers, part III, March 1950, pages 108 to 121.

"A Comprehensive Counting System for Nuclear Physics Research," Moody et al., Review of Scientific Instruments, vol. 22, No. 7, July 1951, part III, pages 455 to 461.